United States Patent [15] 3,639,908

Hovagimyan et al. [45] Feb. 1, 1972

[54] SOLID-STATE ANALOG CROSS-POINT MATRIX HAVING BILATERAL CROSSPOINTS

[72] Inventors: Norman Hovagimyan, Cherry Hill; Robert Neale Van Delft, Pennsauken, both of N.J.

[73] Assignee: RCA Corporation

[22] Filed: Mar. 2, 1970

[21] Appl. No.: 15,396

[52] U.S. Cl. ....................340/166, 340/147

[51] Int. Cl. ....................H04q 1/00, H04q 3/00, H04q 9/00

[58] Field of Search ....................340/166

[56] References Cited

UNITED STATES PATENTS

| | | | |
|---|---|---|---|
| 3,392,373 | 7/1968 | Rouzier | 340/166 |
| 3,550,088 | 12/1970 | Jones | 340/166 |
| 3,550,089 | 12/1970 | Ahrons | 340/147 X |

*Primary Examiner*—Harold I. Pitts
*Attorney*—Edward J. Norton

[57] ABSTRACT

A solid-state switching matrix building block which utilizes bilateral devices to couple analog signals from an input terminal to desired output terminals. The building blocks, including associated logic circuits, are such that they may be built on a single P–MOS integrated circuit chip.

7 Claims, 2 Drawing Figures

Figure 1:
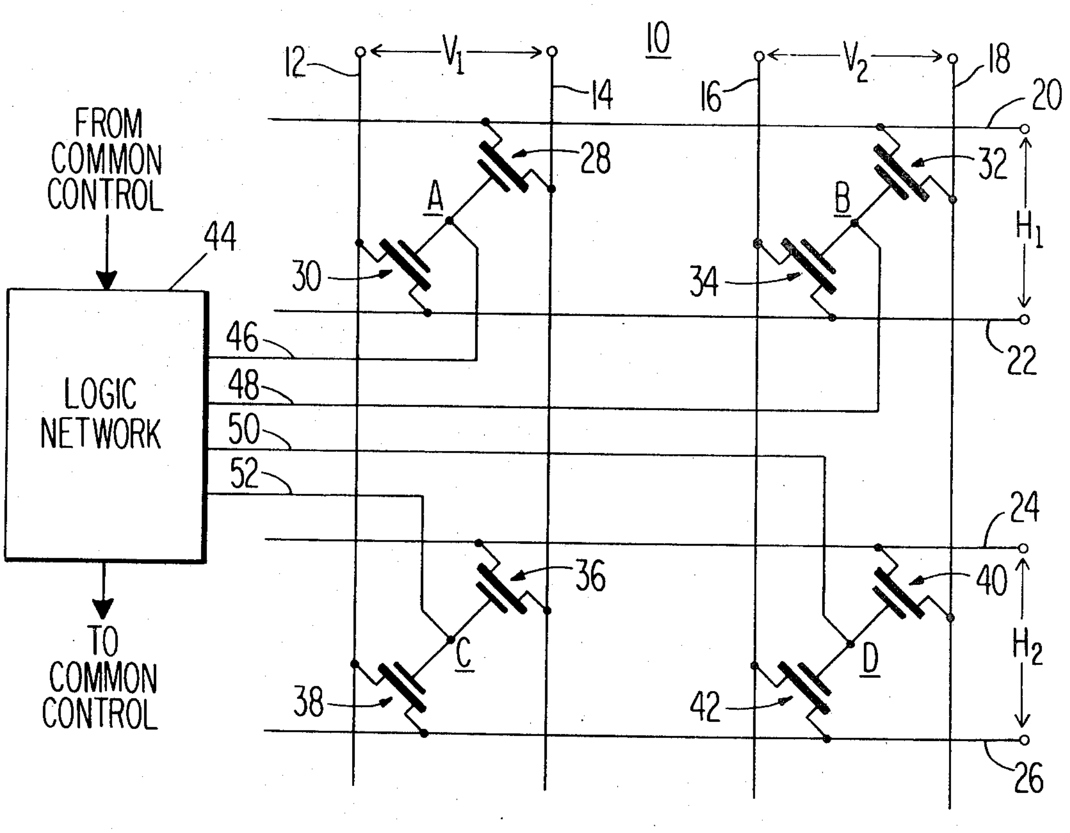

INVENTORS
Norman Hovagimyn
and Robert N. VanDelft
BY Edward J. Norton
ATTORNEY

INVENTORS
Norman Hovagimyan
and Robert N. VanDelft
BY Edward J. Norton
ATTORNEY

SOLID-STATE ANALOG CROSS-POINT MATRIX HAVING BILATERAL CROSSPOINTS

This invention relates to matrix switching systems and more particularly to a solid-state analog signal switching matrix building block.

In the modern communications networks set up throughout the world it is becoming more and more important to have reliable, light weight and inexpensive matrix switching arrays. The prior art-type matrix which used reed relay-type switches has many disadvantages which include its bulky weight, its expense and the fact that the relays have a limited life span. It is desirable to be able to replace the mechanical switches of the prior art with solid-state devices which form the matrix system. It is further desirable to be able to replace these prior art switches with solid-state-type devices which can be incorporated in integrated circuits such as by medium or large scale integration techniques.

The several types of solid-state switching devices which can be used in matrix arrays have many disadvantages. For instance where one desires to use a four layer device, complex logic and control circuits must also be employed to trigger the device and large power sources are necessary. Further, these types of devices result in an increase in crosstalk which must be kept to a minimum for a workable switching matrix, such as one to be used with telephone systems. Another problem is that many solid-state devices have a large resistance even when operating in saturation and thus become impractical to use because of the large power required as well as the fact that the signal would be attenuated. A further problem with many solid-state devices is that their "on" condition is a saturated state whereby analog signals, being passed from input to output terminals, suffer distortion. Such prior art solid-state devices are thus restricted to digital applications.

It is an object of this invention to provide an improved solid-state switching matrix.

In accordance with an embodiment of this invention, there are provided first and second connecting means for connecting respective first and second input lines to first and second output lines. Each of these connecting means includes a plurality of insulated gate field effect transistors, each of which has two main electrodes and a control electrode. The two main electrodes of each transistor in each of the connecting means are respectively connected to an input and an output line; when a switching signal is applied to the control electrodes of the transistors so connected a conduction path exists between that input line and that output line. The switching signal applied to the control electrodes is at an amplitude level such that the transistors are operated in the linear region of their current voltage characteristic.

Figure 2:
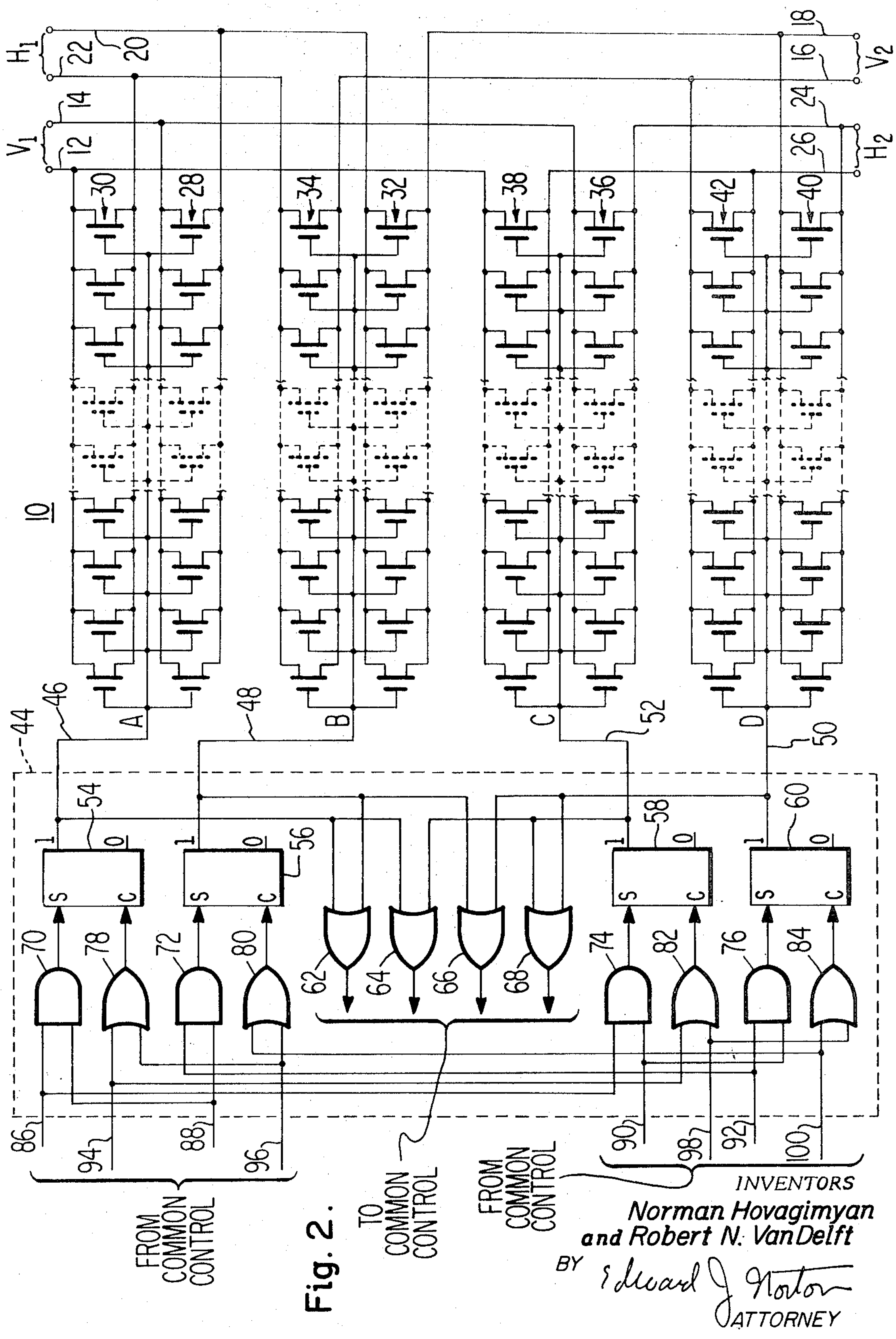

A specific embodiment of the invention is described hereinafter with reference being made to the following Figures in which:

FIG. 1 shows a diagram of a building block which can be used as part of the much larger switching matrix system; and FIG. 2 shows a more detailed diagram of the circuit of FIG. 1.

Referring now to FIG. 1, there is shown a 2 ×2 matrix building block 10 which is part of a larger switching system. In practice, many of these systems would be connected together to form a system of any desired size. Block 10 is such that it may be built on a single P–MOS (P-type channel metal-oxide-semiconductor) gate universal array (GUA) integrated circuit chip which may be constructed by large scale integration (LSI) techniques. The invention may however be practiced with any type of insulated gate field effect transistor and discrete logic elements.

Specifically, circuit 10 has four input lines 12, 14, 16 and 18 and four output lines 20, 22, 24 and 26. A first input analog signal $V_1$ is applied between input lines 12 and 14 and a second input analog signal $V_2$ is applied between input lines 16 and 18. A first output analog signal $H_1$ appears between output lines 20 and 22 and a second output analog signal $H_2$ appears between output lines 24 and 26. In a switching matrix in the type shown by circuit 10, it is desireous to be able to connect the input lines 12, 14, 16 and 18 to the output lines 20, 22, 24 and 26 such that input signal $V_1$ may be applied as either output signal $H_1$ or output signal $H_2$ and input signal $V_2$ may be applied as either output signal $H_1$ or output signal $H_2$.

In order to accomplish this, P–MOS arrays A, B, C, and D are provided. P–MOS array A consists of a first bank of P–MOS (P-type channel metal-oxide-semiconductor) transistors 28, each of which has two main electrodes and a control electrode, and a second bank of P–MOS transistors 30, each of which has two main electrodes and a control electrode. In FIG. 1, banks 28 and 30 are shown as a single transistor but in practice they are a plurality (typically on the order of 20) of such transistors connected in parallel. One common main electrode of the transistors in bank 28 is connected to input line 14 and the other common main electrode of the transistors in bank 28 is connected to output line 20. The main electrodes of each transistor in bank 30 are respectively connected between input line 12 and output line 22. The control electrode of each transistor in banks 28 and 30 are connected together.

Transistor banks 32, 34, 36, 38, 40 and 42 are similar to transistor banks 28 and 30. The control electrodes of each transistor of banks 32 and 34 are connected together as are the control electrode of each transistor in banks 36 and 38 and in banks 40 and 42. The main electrodes of each transistor in bank 32 are connected between input line 18 and output line 20 and the main electrode of each transistor in bank 34 are connected between input line 16 and output line 22. The main electrodes of each transistor in bank 36 are connected between input line 14 and output line 24 and the main electrodes of each transistor in bank 38 are connected between input line 12 and output line 26. Similarly the main electrodes of each transistor in bank 40 are connected between input line 18 and output line 24 and the main electrodes of each transistor in bank 42 are connected between input line 16 and output line 26.

On the same chip as each of the connecting arrays A, B, C, and D, there is also provided a logic network 44 which in response to signals from a common control (not shown) applies a signal via lines 46, 48, 50 and 52 to each connecting array A, B, C, and D. The amplitude level of the signals on lines 46, 48, 50 and 52 are preset such that the corresponding array of transistors will operate in a linear manner, thereby providing a minimum of distortion to the switched analog signals. Line 46 is connected to the junction of the control electrodes of the transistors in banks 28 and 30. Line 48 is connected to the junction of the control electrodes of each of the transistors in banks 32 and 34. Line 50 is connected to the junction of the control electrodes of each of the transistors in banks 40 and 42; and line 52 is connected to the junction of the control electrodes of each of the transistors in banks 36 and 38.

Having the control electrodes outside of the transmission paths aids in limiting or reducing the potential crosstalk problems.

The logic network 44 is arranged such that signals can appear on one or more of the lines 46, 48, 50 and 52 at any given time, depending upon the signals received from the common control (not shown). Whenever a switching signal appears on line 46 the two transistor banks 28 and 30 in connecting array A are rendered conductive and a first connection is made between input line 12 and output line 22, while a second connection is made between input line 14 and output line 20.

In this instance the analog signal $V_1$ appearing at inputs 12 and 14 appears as the output signal $H_1$ between output lines 20 and 22.

Similarly, if a signal appears on line 48 the transistors in banks 32 and 34 are rendered conductive and a connection is made between input lines 16 and 18 and output lines 20 and 22. If a signal appears on line 50 the transistors in transistor banks 40 and 42 are rendered conductive in the linear region of their current voltage characteristics and input lines 16 and 18 are connected to output lines 24 and 26. Finally, whenever a signal appears on line 52, the transistors in transistor banks 36 and 38 are rendered conductive and a connection is made between input lines 12 and 14 and output lines 24 and 26.

Referring now to FIG. 2, where similar numerical designations are given for similar components, it is seen that each of the transistors banks 28, 30, 32, 34, 36, 38, 40 and 42 include many parallel connected P–MOS transistors. The exact number depends on how low one desires the resistance between the two main electrodes of the bank to be when two lines are connected. If only a single transistor were used, this resistance would be about 2,000 ohms. However, where 20 such devices are connected in parallel this resistance would be reduced to approximately 100 ohms. If a further reduction in resistance were desired, it is merely necessary to add additional transistors.

The transistors shown in the matrix of FIG. 2 and in the building block matrix of FIG. 1 are bilateral devices. When the devices are turned on in any one of the banks 28, 30, 32, 34, 36, 38, 40 or 42 the impedance as seen from the corresponding input to output terminals is the same when viewed from the output to input terminals. This bilateral feature allows the user to couple a signal from an input terminal to one or more output terminals or even to one or more other input terminals if so desired.

Logic network 44 is shown in more detail in FIG. 2. Network 44 consists of four bistable circuits such as flip-flops 54, 56, 58 and 60 each of which may be constructed on the same chip of P–MOS elements. Each of flip-flops 54, 56, 58 and 60 have a set (S) and a clear (C) input and a "1" and a "0" output. The "1" amplitude level is preselected to render the transistors to which it is applied conductive in the linear region of their current-voltage characteristics. The "1" output of flip-flop 54 is connected through line 46 to the control electrodes of each transistor in transistor banks 28 and 30. The "1" output of flip-flop 56 is connected through line 48 to each control electrode of the transistors in transistor banks 32 and 34. The "1" output of flip-flop 58 is connected through line 52 to the control electrode of each transistor in transistor banks 36 and 38 and the "1" output of flip-flop 60 is connected through line 50 to the control electrode of each transistor in transistor banks 40 and 42.

There are also provided, on the same chip of P–MOS elements, AND-gate circuits 70, 72, 74 and 76 whose output terminals are respectively connected to the Set input terminals of flip-flops 54, 56, 58 and 60. In addition, on the same chip, there is provided OR-gate circuits 78, 80, 82 and 84 whose output terminals are respectively coupled to the Clear input terminals of flip-flops 54, 56, 58 and 60.

Signals from the common control are provided at one input terminal of each of AND-gates 70 and 74 via line 86. Line 88 provides signals from common control to one input terminal of each of AND-gates 70 and 72. Line 90 provides signals from common control to one input of each of AND-gates 74 and 76. Line 92 provides signals from common control to one input of each of AND-gates 72 and 76.

Signals from common control are also provided at one input terminal of each of OR-gates 78 and 82 via line 94. Line 96 provides signals from common control to one input terminal of each of OR-gates 78 and 80. Line 98 provides signals from common control to one input terminal of each of OR-gates 82 and 84. Line 100 provides signals from common control to one input terminal of each of OR-gates 80 and 84.

There are also provided four OR-gate circuits 62, 64, 66 and 68 each having two inputs and an output. As is well known in the art, if the signal applied to either input of an OR-gate is high, then the signal appearing at the output thereof will similarly be high. If both input signals are low, the signal at the output is low. The two inputs of OR-gate 62 are respectively connected to the "1" outputs of flip-flops 54 and 56. The two inputs of OR-gate 64 are respectively connected to the "1" outputs of flip-flops 54 and 58. The two inputs to OR-gate 66 are respectively connected to the "1" outputs of flip-flops 56 and 60, and the two inputs of OR-gate 68 are respectively connected to the "1" outputs of flip-flops 58 and 60. The signals appearing at the outputs of each of OR-gates 62, 64, 66 and 68 are coupled back to the common control (not shown) to inform the common control that certain connections have been made.

Two of the four signals on lines 86, 88, 90 and 92, provided at AND-gates 70, 72, 74, and 76, from common control (not shown) are applied through one of four AND-gates 70, 72, 74, or 76, to the set (S) input of one of the corresponding one of the flip-flops 54, 56, 58 and 60. One signal identifies which input is to be connected and the other signal identifies which output (or input) is to be connected. Coincidence of these two signals through the selected AND-gate causes the corresponding flip-flops to set and to provide a high signal at the "1" output thereof.

Two of the four signals on lines 94, 96, 98 and 100, provided at OR-gates 78, 80, 82 and 84, from common control (not shown) are applied through one of the four OR-gates 78, 80, 82 or 84, to the clear (C) input of the corresponding one of the flip-flops 54, 56, 58 and 60. One signal identifies which input has been connected and one signal identifies which output has been connected. When either of these signals appears at the proper OR-gate, it causes that flip-flop to reset and thereby provide a low signal at the "1" output thereof. This in turn causes a corresponding one of the connecting arrays A, B, C, or D to become nonconductive and disconnect a pair of input lines to a pair of output lines.

What is claimed is:

1. An analog signal switching matrix building block in which a first input line is to be electrically connected to a first output line and a second input line is to be electrically connected to a second output line, said connections occurring simultaneously on command of a selectively applied switching signal having a predetermined amplitude level, said building block comprising:
   - first and second connecting means each of which includes a plurality of bilateral conducting field effect transistors, each of said transistors having a control electrode to which said switching signal is applied and two main electrodes, there being a conductive path between said main electrodes when said switching signal is applied to said control electrode, said switching signal having a predetermined amplitude level for operating corresponding field effect transistors in their linear regions;
   - each of the transistors in said first connecting means having corresponding main electrodes connected together and control electrodes connected together;
   - each of the transistors in said second connecting means having corresponding main electrodes connected together and control electrodes connected together;
   - means for connecting the control electrodes of said first connecting means and the control electrodes of said second connecting means to a common point;
   - each of said first and second connecting means being respectively connected between a different one of said first input and first output lines or said second input and second output lines such that one main electrode of the transistors of said connecting means is coupled to an input line and the other main electrode of the transistor of said connecting means is coupled to an output line and;
   - signaling means coupled to said common point for selectively applying said switching signal having a predetermined amplitude level to the control electrode of each of said transistors of said first and second connecting means.

2. The invention according to claim 1, wherein said building block is formed on an integrated circuit.

3. The invention according to claim 1,
   - wherein third and fourth output lines which are to be respectively electrically connected to said first and second input lines on command of said switching signal are further provided;
   - wherein said building block further includes third and fourth connecting means each of which includes a plurality of bilateral conducting field effect transistors, each of said transistors having a control electrode to which said switching signal having a predetermined amplitude level is applied and two main electrodes, there being a conductive path between said main electrodes when said switching signal is applied to said control electrode thereof, each of the transistors in said third connecting means having corresponding main electrodes connected together and control electrodes connected together, each of the transistors in said fourth connecting means having corresponding main electrodes connected together and control electrodes connected together, the control electrodes of said third and fourth connecting means being connected to a second common point, each of the third and fourth connecting means being respectively connected between a different one of said first input and third output lines or said second input and fourth output lines such that one main electrode of the transistor of said third and fourth connecting means is coupled to an input line and the other main electrode of said third and fourth connecting means is coupled to an output line; and wherein said signaling means applies said switching signal having a predetermined amplitude level to the first common point or the second common point.

4. The invention according to claim 3, wherein the number of transistors in each of said connecting means is sufficient to reduce the resistance between said respective input and output line, when said switching signal is applied to said connecting means, substantially below the resistance between the main electrodes of a single transistor when rendered conductive.

5. An analog switching matrix system comprising:

first, second, third, and fourth input lines and first, second, third and fourth output lines;

eight separate bidirectional connecting means for respectively connecting on command of at least one switching signal having a predetermined amplitude level said first input and second output lines, said first input and fourth output lines, said first input and third input lines said second input and first output lines, said second input and third output lines, said second input and fourth input lines, said third input and second output lines, said third input and fourth output lines, said third input land first input lines, said fourth input and first output lines, said fourth input and third output lines, and said fourth input and second input lines;

each of said connecting means including a plurality of parallel connected bidirectional conducting field effect transistors having two main electrodes and a control electrode, one of said main electrodes of each of said transistors being connected to an input line the other of said main electrode of each of said transistors being coupled to an output line, and means responsive to a plurality of signals from a common control for selectively applying said at least one switching signal to the control electrodes of at least one pair of said connecting means whereby selected ones of said input lines are connected to selected ones of said output or input lines.

6. The invention according to claim 5, wherein said switching signal means includes four bistable circuits responsive to said common control signals for providing switching signals of a predetermined amplitude level, each of said bistable circuits applying a switching signal to the control electrodes of each transistor in a pair of said connecting means and each transistor in each of said connecting means being responsive to a switching signal from only one of said bistable circuits.

7. The invention according to claim 5, wherein the number of transistors in each of said connecting means is sufficient to substantially reduce the resistance of said connecting means from the resistance across the main electrodes of a single one of said transistors when said switching signal is applied to that connecting means.

* * * * *